United States Patent
Seon (10) Patent No.: US 7,881,301 B2
(45) Date of Patent: Feb. 1, 2011

(54) APPARATUS AND METHOD FOR PROCESSING PACKET IN VOICE AND DATA INTEGRATION SYSTEM

(75) Inventor: Min-Kyu Seon, Gunpo-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 857 days.

(21) Appl. No.: 11/602,299

(22) Filed: Nov. 21, 2006

(65) Prior Publication Data

US 2007/0127466 A1  Jun. 7, 2007

(30) Foreign Application Priority Data

Dec. 1, 2005  (KR) .................... 10-2005-0116502

(51) Int. Cl.
*H04L 12/28* (2006.01)
*H04L 12/54* (2006.01)

(52) U.S. Cl. .................... 370/394; 370/412; 370/428

(58) Field of Classification Search .................... None
See application file for complete search history.

(56) References Cited

U.S. PATENT DOCUMENTS

| | | | |
|---|---|---|---|
| 6,741,603 B2 * | 5/2004 | Pate et al. | 370/412 |
| 6,785,261 B1 * | 8/2004 | Schuster et al. | 370/352 |
| 6,832,261 B1 * | 12/2004 | Westbrook et al. | 709/236 |
| 7,260,085 B2 * | 8/2007 | Dobbins et al. | 370/352 |
| 7,269,172 B2 * | 9/2007 | Kurth | 370/392 |
| 7,336,678 B2 * | 2/2008 | Vinnakota et al. | 370/429 |
| 7,499,452 B2 * | 3/2009 | Shearer et al. | 370/394 |
| 7,548,539 B2 * | 6/2009 | Kouretas et al. | 370/356 |
| 2002/0031086 A1 * | 3/2002 | Welin | 370/229 |
| 2002/0167911 A1 * | 11/2002 | Hickey | 370/252 |
| 2004/0120308 A1 | 6/2004 | LeBlanc | |
| 2005/0166135 A1 * | 7/2005 | Burke et al. | 715/500.1 |
| 2005/0180327 A1 * | 8/2005 | Banerjee et al. | 370/236 |
| 2005/0237998 A1 * | 10/2005 | Okuda et al. | 370/352 |

FOREIGN PATENT DOCUMENTS

| | | |
|---|---|---|
| EP | 1 694 029 | 8/2006 |
| GB | 2 392 062 | 5/2002 |
| GB | 2392062 A * | 2/2004 |
| KR | 2001-0002241 | 1/2001 |
| KR | 10-2004-0041640 | 5/2004 |

OTHER PUBLICATIONS

UK Search Report, corresponding to UK Patent Application No. 0623285.4, issued on Feb. 28, 2007.

Korean Office Action for Korean Patent Application No. 2005-0116502 issued on Nov. 14, 2006.

* cited by examiner

*Primary Examiner*—Chirag G Shah
*Assistant Examiner*—Jenkey Van
(74) *Attorney, Agent, or Firm*—H.C. Park & Associates, PLC (57) ABSTRACT

An apparatus and method for processing a packet in a voice and data integration system are provided. The voice and data integration apparatus includes: a digital signal processor (DSP) for decoding a packet into PCM (pulse code modulation) data; and a host driver for receiving one or more packets from an Internet protocol (IP) network for a predetermined time, storing the received packets in storage regions in the order of sequence numbers, and transmitting the packets to the DSP in the order of the sequence numbers when the predetermined time has elapsed. Accordingly, a quality of voice in voice communication using the voice and data integration apparatus is guaranteed to a maximal extent.

24 Claims, 9 Drawing Sheets

APPARATUS AND METHOD FOR PROCESSING PACKET IN VOICE AND DATA INTEGRATION SYSTEM

This application makes reference to, incorporates the same herein, and claims all benefits accruing under 35 U.S.C. §119 from an application for APPARATUS AND METHOD FOR PROCESSING PACKET IN VOICE AND DATA INTEGRATION SYSTEM earlier filed in the Korean Intellectual Property Office on 1 Dec. 2005 and there duly assigned Serial No. 2005-116502.

BACKGROUND OF THE INVENTION

1. Field of the Invention

The present invention relates to an apparatus and method for processing a packet in a voice and data integration system.

2. Description of the Related Art

Owing to today's rapid popularization of Internet and its accompanying request for various services, an Internet protocol (IP) network is being remarkably advanced in its performance and service. Accordingly, a request for more various services is continuously increased.

IP network-based voice transmission, one of such services, plays a great role in the IP network together with data transmission. Hence, a request for various voice transmission functions is also made together. Accordingly, terminals such as a digital telephone and a single telephone have been required to integrate voice IPs (VoIP: Voice over Internet Protocol).

Thus, a voice and data integration apparatus begins to be developed so that conventional terminals and Internet terminals can exchange data or voice with each other through the IP network.

Such a voice and data integration apparatus performs a gateway function of matching the IP network and each terminal, and performs a VoIP gateway function of decoding a voice packet received from the IP network into pulse code modulation (PCM) data and transmitting the decoded data to the terminal, or encoding the PCM data received from the terminal into the voice packet and transmitting the encoded data to the IP network.

Further, main factors deteriorating a quality of voice communication in a network such as an IP network include a loss of packet, a delay, and a jitter.

1) Loss of Packet: phenomenon in which a packet is lost during transmission on the network and thus not decoded in the voice and data integration apparatus, and thereby a quality of voice is remarkably deteriorated.

2) Delay: phenomenon in which a packet is temporally delayed when output, compared to when input, and each packet is differently delayed depending on a route along which the packet is transmitted on the network.

3) Jitter: phenomenon in which queuing and congestion occurring in network equipment due to a different rate of delay of each packet. Each piece of network equipment should include a jitter buffer in order to prevent this phenomenon, but the jitter buffer causes transmission delay.

Accordingly, in order to guarantee the quality of voice communication over the IP network, techniques such as dynamic jitter buffering for dynamically adjusting a size of the jitter buffer, Real-time Transport Protocol (RTP) compressing for compressing a Real-time Transport Protocol (RTP) packet as a voice packet, and Real-time Transport Protocol (RTP) multi-framing for splitting a voice packet have been utilized. See Network Working Group Request for Comments (RFC) 1889-RTP: A Transport Protocol for Real-Time Applications; Audio-Video Transport Working Group, H. Schulzrinne et al. January 1996 or Network Working Group Request for Comments (RFC) 3550-RTP: A Transport Protocol for Real-Time Applications; H. Schulzrinne et al. July 2003. However, a perfect quality of voice is not yet guaranteed.

Further, in the conventional voice and data integration apparatus, an algorithm for guaranteeing the quality of voice is processed only in a digital signal processing (DSP) manufactured in a manufacture company. Hence, the algorithm is not so good in extensibility and reliability.

SUMMARY OF THE INVENTION

It is, therefore, an objective of the present invention to provide an apparatus and method for processing a packet in a voice and data integration system, which escapes from a simple construction for processing a voice packet using only an algorithm embedded in a conventional digital signal processing (DSP), thereby guaranteeing a more improved quality of voice.

According to an aspect of the present invention, there is provided a voice and data integration apparatus including: a digital signal processor (DSP) for decoding a packet into pulse code modulation (PCM) data; and a host driver for receiving one or more packets from an Internet protocol (IP) network for a predetermined time, storing the received packets in storage regions in order of sequence numbers, and transmitting the packets to the DSP in the order of sequence numbers when the predetermined time has lapsed,.

The host driver may include: an interface for receiving the packet from the IP network; a buffer having a plurality of storage regions for storing the respective packets; and a packet sorting unit for storing the respective packets in the storage regions of the buffer corresponding to the sequence numbers, and transmitting the packets to the DSP in the sequence of the storage regions of the buffer when the predetermined time has lapsed,.

The packet sorting unit may designate a region, which completes transmitting the packet to the DSP, of the storage regions of the buffer as a completion position, and designate a next storage region adjacent to the completion position as a start position.

The packet sorting unit may search a storage position corresponding to the sequence number of the packet, from the start position, and store the packet in a storage region of the storage position.

The packet sorting unit may detect a first sequence number from a sequence number of a first packet previously received and stored in a first storage region, and when a second sequence number of a currently received second packet is larger than the first sequence number, store the second packet in a second storage region corresponding to the second sequence number, and copy and store the first packet in a blank storage region between the first and second storage regions.

In a blank storage region, which is within a range of a copy threshold, of the blank storage regions, the packet sorting unit may copy and store the first packet, and indicate a packet loss concealment (PLC) flag informing that a packet is lost.

In a blank storage region beyond the copy threshold, the packet sorting unit may indicate a bad frame indication (BFI) flag informing that a packet is lost.

The copy threshold may be a smaller one of a value corresponding to a double size value of a transmission period of the packet, and a value of packet loss.

The value of packet loss may be a size value corresponding to a value that is obtained by dividing a difference between a TimeStamp value of the first packet and a TimeStamp value of the second packet by a transmission period of a set voice codec.

When the second sequence number is less than the first sequence number, when a storage position of the second packet is not provided between the completion position and the start position, the packet sorting unit may discard the second packet.

When the storage position is provided between the completion position and the start position, the packet sorting unit may store the second packet at the storage position and, when a PLC or BFI flag is stored in an storage region within a range of a copy threshold and adjacent to the storage position, the packet sorting unit may copy and store the second packet in the storage region.

The packet sorting unit may repeatedly store a received frame in the storage region as much as a multi-frame value of the second packet.

The multi-frame value may be a value obtained by dividing payload length information of a packet based on a voice codec by payload size information of the second packet.

The buffer may be a ring buffer employing a circulation storing method.

The packet may be a real-time transport protocol (RTP) packet.

According to another aspect to the present invention, there is provided a host driver of a voice and data integration apparatus, the driver including: a buffer having one or more storage regions; and a packet sorting unit for storing a first packet received from an Internet protocol (IP) network, in a first storage region, and when a second sequence number of a second packet is greater by a predetermined size than a first sequence number of the first packet, storing the second packet in a second storage region corresponding to the second sequence number, and copying and storing the first packet in a blank storage region between the first and second storage regions.

The packet sorting unit may copy and store the first packet in a blank storage region within a range of a copy threshold and adjacent to the first storage region.

According to yet another aspect of the present invention, there is provided a host driver of a voice and data integration apparatus, the driver including: a buffer having one or more storage regions; and a packet sorting unit for storing a first packet received from an IP network, in a first storage region, and when a sequence number of a second packet is less than a sequence number of the first packet, storing the second packet in a second storage region corresponding to the sequence number, and when a packet is lost in an storage region within a range of a copy threshold and adjacent to the second storage region, copying and storing the second packet therein.

When there is a storage region completing packet transmission between the first and second storage regions, the packet sorting unit may discard the second packet.

According to yet another aspect of the present invention, there is provided a method of processing a packet in a voice and data integration apparatus, the method including the steps of: storing a first packet received from an IP network, in a first storage region, and predicting a first sequence number from a sequence number of the first packet; when a second sequence number of a second packet is the same as the first sequence number, storing the second packet in a second storage region corresponding to the second sequence number; when the second sequence number is greater than the first sequence number, performing lost-packet processing; when the second sequence number is less than the first sequence number, performing packet re-sort processing; and when a predetermined time has expired, sequentially processing the packets stored in the respective storage regions.

The first sequence number may be greater by one level than the sequence number of the first packet.

The step of storing of the respective packets in the respective storage regions may include the steps of: designating the region, which completes packet processing, of the respective storage regions as a completion position, and designating a next storage region adjacent to the completion position, as a start position; and searching an storage position corresponding to the sequence number of the packet from the start position, and storing the packet in an storage region of the storage position.

The step of performing the packet loss processing may include the steps of: storing the second packet in the second storage region corresponding to the second sequence number; selecting a smaller one from a double size value of the packet and a value of packet loss, as a copy threshold; in an storage region, which is within a range of the copy threshold, of blank storage regions provided between the first and second storage regions, copying and storing the first packet, and indicating a packet loss concealment (PLC) flag informing that a packet is lost; and indicating a bad frame indication (BFI) flag informing that a packet is lost in a blank storage region beyond the range of the copy threshold.

The value of packet loss may be a size value corresponding to a value that is obtained by dividing a difference between a TimeStamp value of the first packet and a TimeStamp value of the second packet by a transmission period of a set voice codec.

The step of performing the packet re-sort processing may include the steps of: storing the second packet in the second storage region corresponding to the second sequence number; and when a PLC or BFI flag is stored in an storage region within the range of the copy threshold and adjacent to the second storage region, copying and storing the second packet in the storage region.

The method may further include the step of, when the second storage region is not provided between the completion position and the start position, discarding the second packet.

The method may further include the steps of: calculating a value obtained by dividing payload length information of a packet based on a voice codec by payload size information of the second packet, as a multi-frame value; and repeatedly storing a received frame in the second storage region as much as the multi-frame value.

According to yet another aspect of the present invention, there is provided a method of processing a packet in a voice and data integration apparatus, the method including the steps of: storing a first packet received from an IP network, in a first storage region; when a second sequence number of a second packet is greater by a predetermined size than a sequence number of the first packet, storing the second packet in a second storage region following the first storage region as much as a difference between the respective sequence numbers; and copying and storing the first packet in a blank storage region between the first and second storage regions.

According to yet another aspect of the present invention, there is provided a method of processing a packet in a voice and data integration apparatus, the method including the steps of: storing a first packet received from an IP network, in a first storage region; when a second sequence number of a second packet is less than a first sequence number of the first packet, storing the second packet in a second storage region preceding the first storage region as much as a difference between the respective sequence numbers; and when a packet is lost in an storage region adjacent to the second storage region, copying and storing the first packet therein.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols express the same or similar components, wherein.

DETAILED DESCRIPTION OF THE PREFERRED EMBODIMENTS

Hereinafter, exemplary embodiments of the present invention will be described in detail with reference to the accompanying drawings. In the following description, a detailed description of known functions and configurations incorporated herein has been omitted for conciseness.

Figure 1:
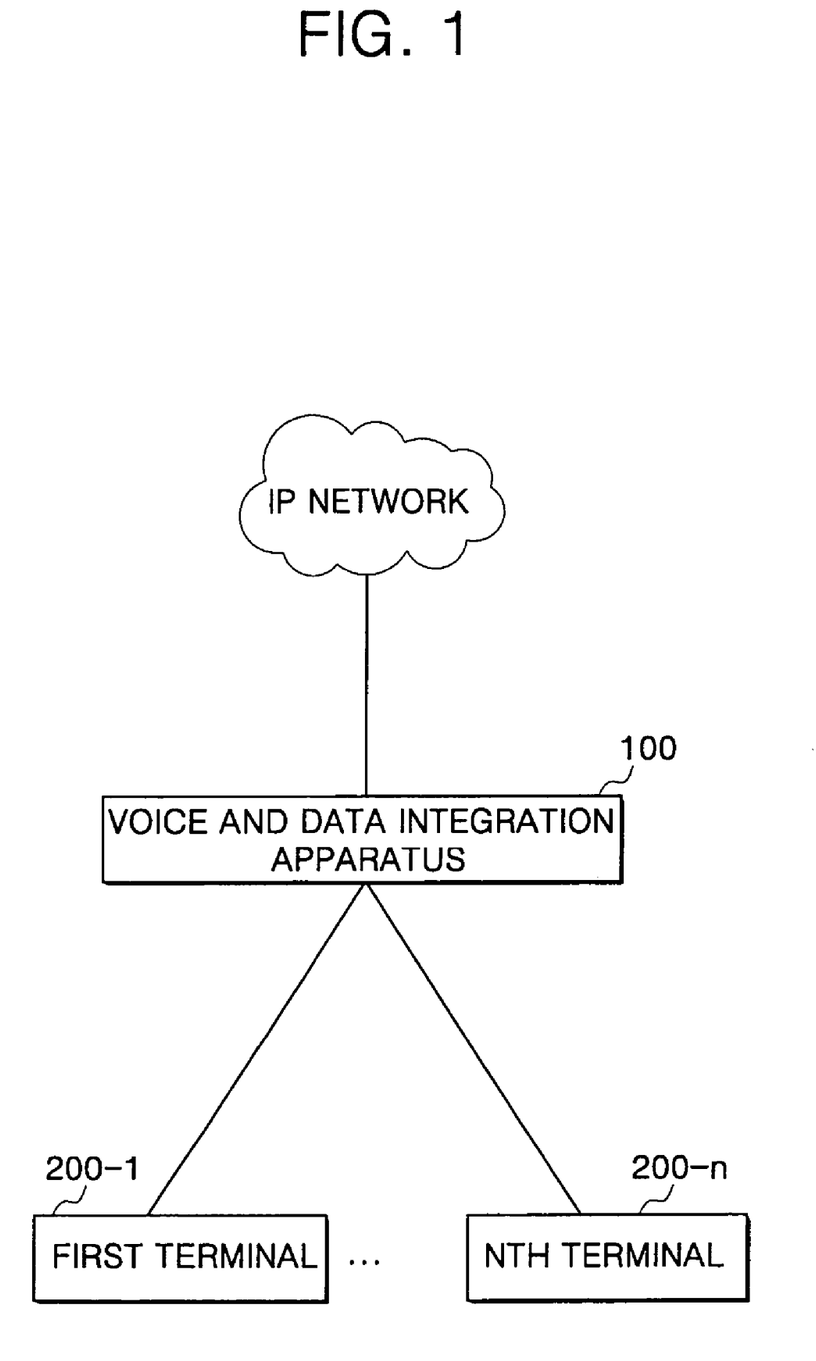
FIG. 1 is a block diagram of a voice and data integration system according to an exemplary embodiment of the present invention.

FIG. 1 is a block diagram of a voice and data integration system according to an exemplary embodiment of the present invention.

Referring to FIG. 1, a voice and data integration system includes a plurality of terminals 200, and a voice and data integration apparatus 100 that is connected with an Internet protocol (IP) network and each terminal 200, and exchanges a voice packet and a data packet between each terminal 200 and the IP network.

The voice and data integration apparatus 100 mainly performs a data gateway function for exchanging the data packet between the IP network and each terminal 200, and a VoIP gateway function for exchanging the voice packet between the IP network and each terminal 200.

A function of processing the voice packet in the voice and data integration apparatus 100 will now be described in detail.

Figure 2:
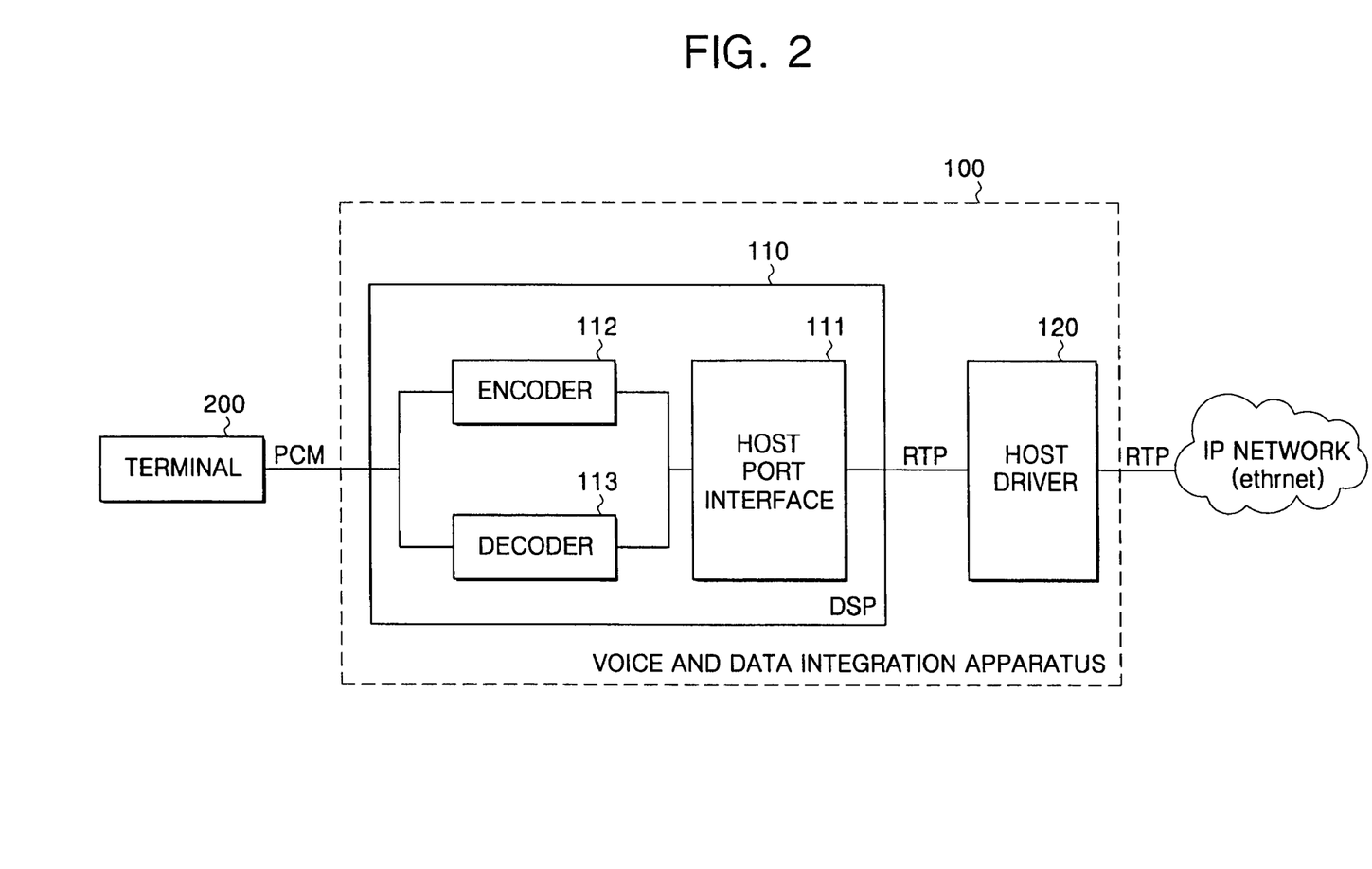
FIG. 2 is a block diagram of a voice and data integration apparatus according to an exemplary embodiment of the present invention.

FIG. 2 is a block diagram of a voice and data integration apparatus according to an exemplary embodiment of the present invention.

Referring to FIG. 2, a voice and data integration apparatus 100 includes a host driver 120 and a digital signal processor (DSP) 110. The digital signal processor (DSP) 110 includes an encoder 112, a decoder 113, and a host port interface 111.

The host port interface 111 receives a Real-time Transport Protocol (RTP) packet, a voice packet, from the IP network via the host driver 120, and transmits the received packet to the decoder 113.

The decoder 113 decodes the Real-time Transport Protocol (RTP) packet into pulse code modulation (PCM) data, and transmits the decoded PCM data to a corresponding terminal 200.

The terminal 200 transmits PCM data based on voice information input by a user to the encoder 112 of the digital signal processor (DSP) 110. The encoder 112 encodes the PCM data and transmits it in a Real-time Transport Protocol (RTP) packet to the host driver 120 through the host port interface 111.

The host driver 120 transmits the Real-time Transport Protocol (RTP) packet, which is the voice packet of the packets received from the digital signal processor (DSP) 110, to the IP network.

The host driver 120 sorts the received Real-time Transport Protocol (RTP) packets in sequence, and transmits the sorted Real-time Transport Protocol (RTP) packets to the digital signal processor (DSP) 110 or the IP network.

Figure 3:
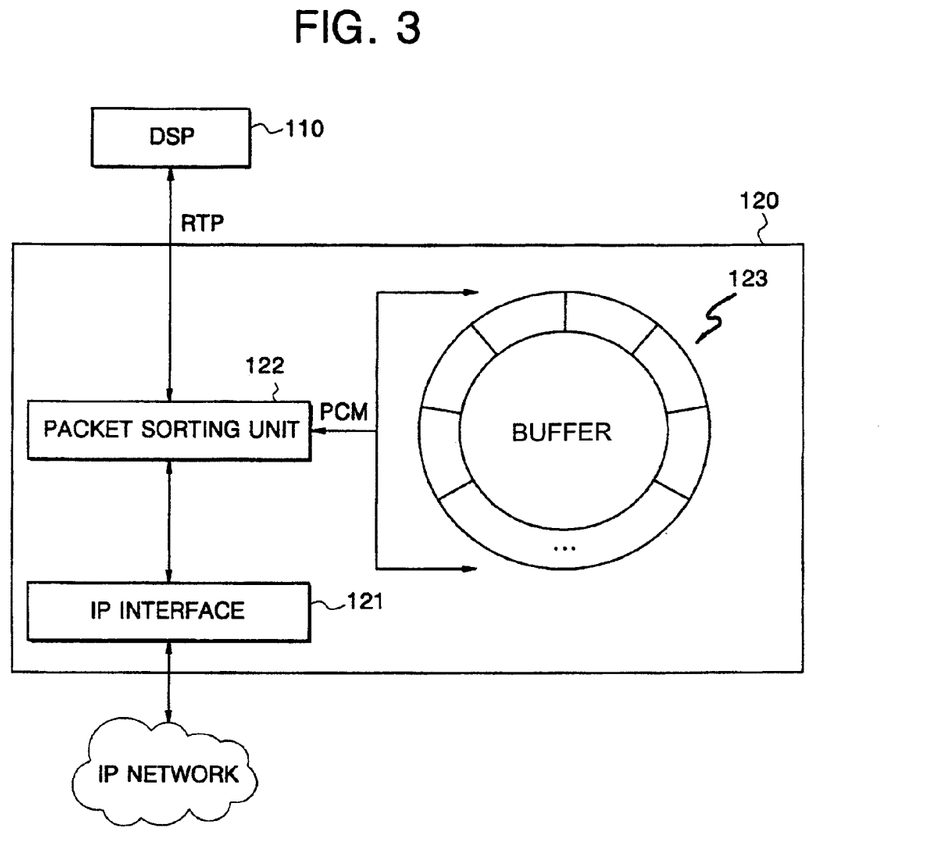
FIG. 3 is a block diagram of a host driver according to an exemplary embodiment of the present invention.

FIG. 3 is a block diagram of a host driver according to an exemplary embodiment of the present invention.

Referring to FIG. 3, the host driver 120 according to an exemplary embodiment of the present invention includes a buffer 123 for temporarily storing a plurality of packets, a packet sorting unit 122, and an IP interface 121.

The IP interface 121 receives the Real-time Transport Protocol (RTP) packet from the IP network, or transmits the Real-time Transport Protocol (RTP) packet encoded in the digital signal processor (DSP) 110 to the IP network.

The buffer 123 preferably makes use of a circulation type of ring-like buffer. The buffer 123 temporarily stores the Real-time Transport Protocol (RTP) packet received from the IP network or the digital signal processor (DSP) 110.

The packet sorting unit 122 detects information on sequence numbers of the received Real-time Transport Protocol (RTP) packets, sorts the Real-time Transport Protocol (RTP) packets by sequence numbers, and temporarily stores the sorted Real-time Transport Protocol (RTP) packets in the buffer 123.

The packet sorting unit 122 determines a sort time taken to temporarily store and sort the received Real-time Transport Protocol (RTP) packets in the buffer 123, depending on a transmission period (10 ms or 20 ms) or a compression rate defined in a set voice codec (e.g., G.711 and G.729).

When detecting the sequence number information of the received Real-time Transport Protocol (RTP) packets and determining a position of the buffer 123 to temporarily store the Real-time Transport Protocol (RTP) packets, the packet sorting unit 122 sequentially transmits the Real-time Transport Protocol (RTP) packets stored in the buffer 123 to the digital signal processor (DSP) 110 or the IP network when the sort time has expired.

The Real-time Transport Protocol (RTP) packet having a great influence on a quality of voice is received from the IP network. Therefore, a case where the host driver 120 processes the Real-time Transport Protocol (RTP) packet received from the IP network will be described below in detail.

Figure 4:
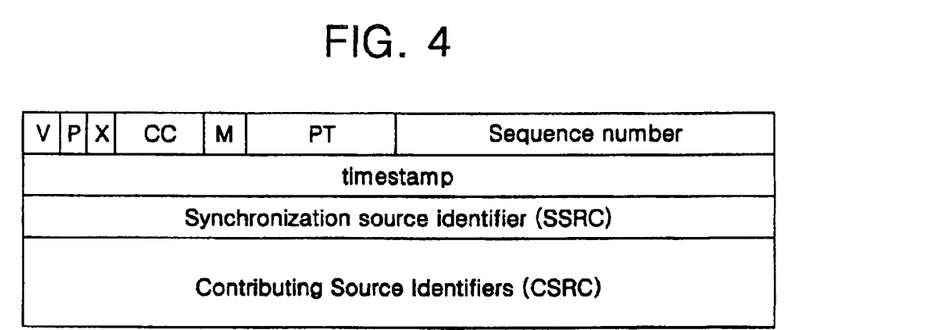
FIG. 4 illustrates a header of a Real-time Transport Protocol (RTP) packet utilized according to the present invention.

FIG. 4 illustrates a header of a Real-time Transport Protocol (RTP) packet utilized according to the present invention.

As illustrated in FIG. 4, the header of a Real-time Transport Protocol (RTP) packet includes a version field (V) indicating a Real-time Transport Protocol (RTP) version, a padding field (P) indicating that a packet has a smaller size than real data, an extension field (X) indicating that there is one variable-length header, a CSRC number field (CC) indicating the number of contributing source (CSRC) identifiers following the header, a marker field (M) indicating an event such as a frame boundary, at a packet stream, and a payload type field (PT) indicating an encoding type of voice or media.

The Real-time Transport Protocol (RTP) packet header includes a sequence number field (Sequence number) indicating a transmission sequence of the Real-time Transport Protocol (RTP) packets, a TimeStamp field (TimeStamp) indicating a time taken to sample a blue octet of the Real-time Transport Protocol (RTP) packet, and a synchronization source identifier field (SSRC) used for calculating a jitter.

The packet sorting unit 122 detects the sequence number information in the Real-time Transport Protocol (RTP) packet header illustrated in FIG. 4, and determines the position of the buffer 123 to store the Real-time Transport Protocol (RTP) packet.

FIGS. 5A-5D illustrate a method for storing Real-time Transport Protocol (RTP) packets in a buffer according to an exemplary embodiment of the present invention.

Figure 5A:
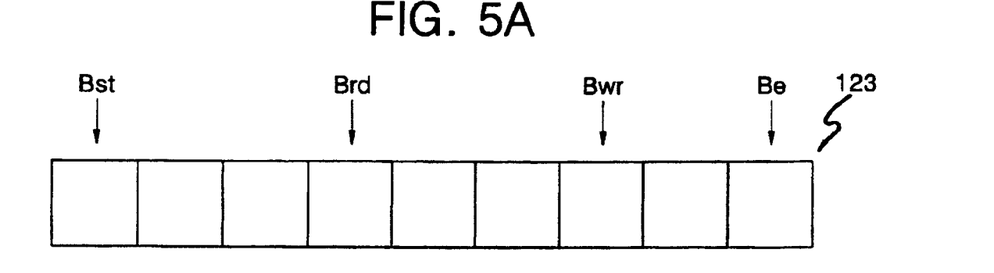
FIGS. 5A-5D illustrate a method for storing a Real-time Transport Protocol (RTP) packet in a buffer according to an exemplary embodiment of the present invention.

More specifically, in FIG. 5A, a circulation type of buffer 123 is illustrated to be a stick type of buffer 123 for convenience of description. Actually, a start position (Bst) and an end position (Be) of the buffer 123 are connected in succession and form the ring type of buffer.

The position Brd denotes a completion position where the packet sorting unit 122 completes transmission of the Real-time Transport Protocol (RTP) packet stored in the buffer 123 to the digital signal processor (DSP) 110, whereas the position Bwr denotes a storage position for storing the next received Real-time Transport Protocol (RTP) packet.

Figure 5B:
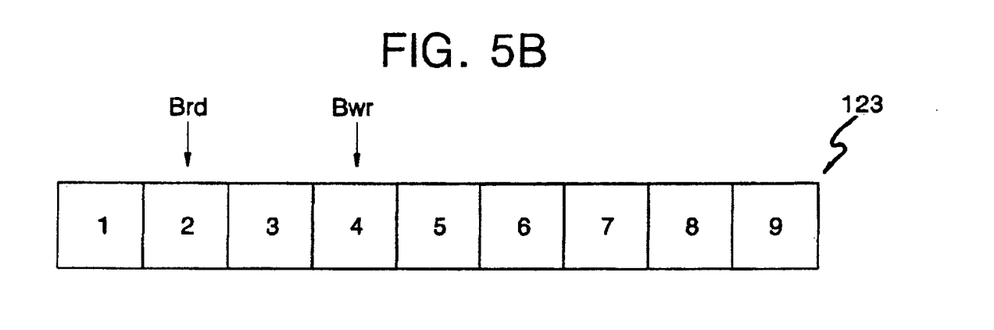

FIG. 5B illustrates information on sequence numbers of Real-time Transport Protocol (RTP) packets predicted by the packet sorting unit 122. As illustrated in FIG. 5B, the packet sorting unit 122 transmits a Real-time Transport Protocol (RTP) packet having sequence No. 2 to the digital signal processor (DSP) 110, temporarily stores a Real-time Transport Protocol (RTP) packet having sequence No. 3, and receives and predicts a Real-time Transport Protocol (RTP) packet having sequence No. 4.

However, due to a loss or load of packet on the network, the packet sorting unit 122 may receive a Real-time Transport Protocol (RTP) packet having sequence No. 7 without receiving the Real-time Transport Protocol (RTP) packet having sequence No. 4. In this case, the packet sorting unit 122 stores the received Real-time Transport Protocol (RTP) packet having sequence No. 7, i.e., No. 7 Real-time Transport Protocol (RTP) packet, in the storage position (Bwr).

The packet sorting unit 122 detects blank storage regions (fourth, fifth, sixth, and seventh storage regions) in which no Real-time Transport Protocol (RTP) packet is stored, copies the Real-time Transport Protocol (RTP) packet of an storage region (i.e. third storage region) just before the blank storage regions, and stores the copied Real-time Transport Protocol (RTP) packet in the blank storage regions.

Figure 5C:
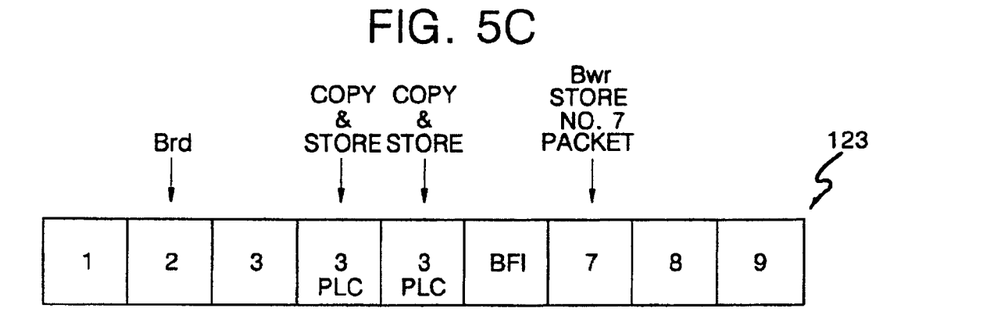

FIG. 5C illustrates a process of storing a Real-time Transport Protocol (RTP) packet in a blank storage region of a buffer 123. The Real-time Transport Protocol (RTP) packet stored in the third storage region is copied and stored in the fourth and fifth storage regions, and stores a packet loss concealment (PLC) flag, which indicates that the packet having the sequence number to be stored in a corresponding storage region is lost.

The packet sorting unit 122 copies and stores the Real-time Transport Protocol (RTP) packet in the blank storage region using a copy threshold of the Real-time Transport Protocol (RTP) packet. The copy threshold approximately is a double size of the Real-time Transport Protocol (RTP) packet. In other words, the copy threshold becomes a size value corresponding to a double value of the transmission period of the voice codec that is set for the voice and data integration apparatus 100.

The copy threshold is derived from an experimental value that the number of overlapping Real-time Transport Protocol (RTP) packets for guaranteeing a maximal quality of voice is about three.

The packet sorting unit 122 derives a value obtained by dividing a difference between a TimeStamp value of the received Real-time Transport Protocol (RTP) packet and a TimeStamp value of the previously received Real-time Transport Protocol (RTP) packet by the transmission period of the voice codec, and confirms a value of packet loss. Here, the value of packet loss is the same as the number of blank storage regions, and the packet sorting unit 122 selects a smaller value of the value of packet loss and a result value doubling a payload length of the Real-time Transport Protocol (RTP) packet as the copy threshold.

The packet sorting unit 122 stores a bad frame indication (BFI) flag in the blank storage region except the blank storage region in which the PLC flag is stored, that is, the copied Real-time Transport Protocol (RTP) packet is stored, thereby indicating that the Real-time Transport Protocol (RTP) packet is not stored.

Figure 5D:
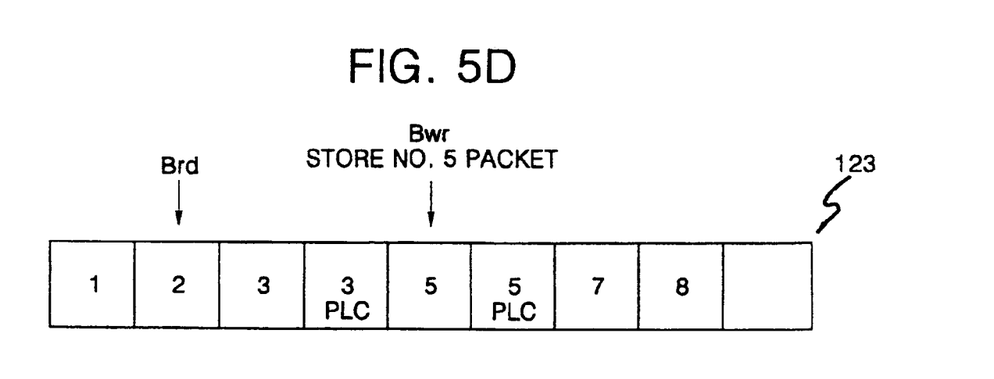

FIG. 5D illustrates a case of receiving a Real-time Transport Protocol (RTP) packet having a lower sequence number than a currently received Real-time Transport Protocol (RTP) packet. After receiving No. 7 Real-time Transport Protocol (RTP) packet and then No. 5 Real-time Transport Protocol (RTP) packet, the packet sorting unit 122 determines a 'fifth' storage region as the storage position (Bwr).

The packet sorting unit 122 checks whether or not the Real-time Transport Protocol (RTP) packet is received in a multi-frame form. In other words, the packet sorting unit 122 can detect a multi-frame value through a value obtained by dividing information on a payload length of the Real-time Transport Protocol (RTP) packet based on a type of the voice codec by information on an actual payload size.

The packet sorting unit 122 stores frames of the Real-time Transport Protocol (RTP) packets, which are repeatedly received as much as the multi-frame value, in the fifth storage region. In other words, one Real-time Transport Protocol (RTP) packet is split and received as much as the multi-frame value, and thus is repeatedly stored in the fifth storage region as much as the multi-frame value.

The packet sorting unit 122 stores the No. 5 Real-time Transport Protocol (RTP) packet in the fifth storage region, and checks whether or not a Real-time Transport Protocol (RTP) packet is normally stored in the next storage region adjacent to the fifth storage region. In other words, the packet sorting unit 122 checks whether or not the PLC flag or the BFI flag is stored in the sixth and seventh storage regions that are the next sequential storage regions within a range of the copy threshold starting with the fifth storage region.

As illustrated in FIG. 5C, the BFI flag is stored in the sixth storage region and therefore, the packet sorting unit 122 copies and stores No. 5 Real-time Transport Protocol (RTP) packet in the sixth storage region as illustrated in FIG. 5D.

Further, because No. 7 Real-time Transport Protocol (RTP) packet is normally stored in the seventh storage region, "No. 7" Real-time Transport Protocol (RTP) packet stored in the seventh storage region is kept as it is.

In other words, when the Real-time Transport Protocol (RTP) packet is received with its sequence number inverted, the packet sorting unit 122 stores the received Real-time Transport Protocol (RTP) packet at the storage position (Bwr), checks whether or not the PLC or BFI flag is stored in the storage region, which is within a range of the copy threshold, among the next storage regions adjacent to the storage position (Bwr), and copies and stores the Real-time Transport Protocol (RTP) packet, which has been stored at the storage position (Bwr).

Figure 6:
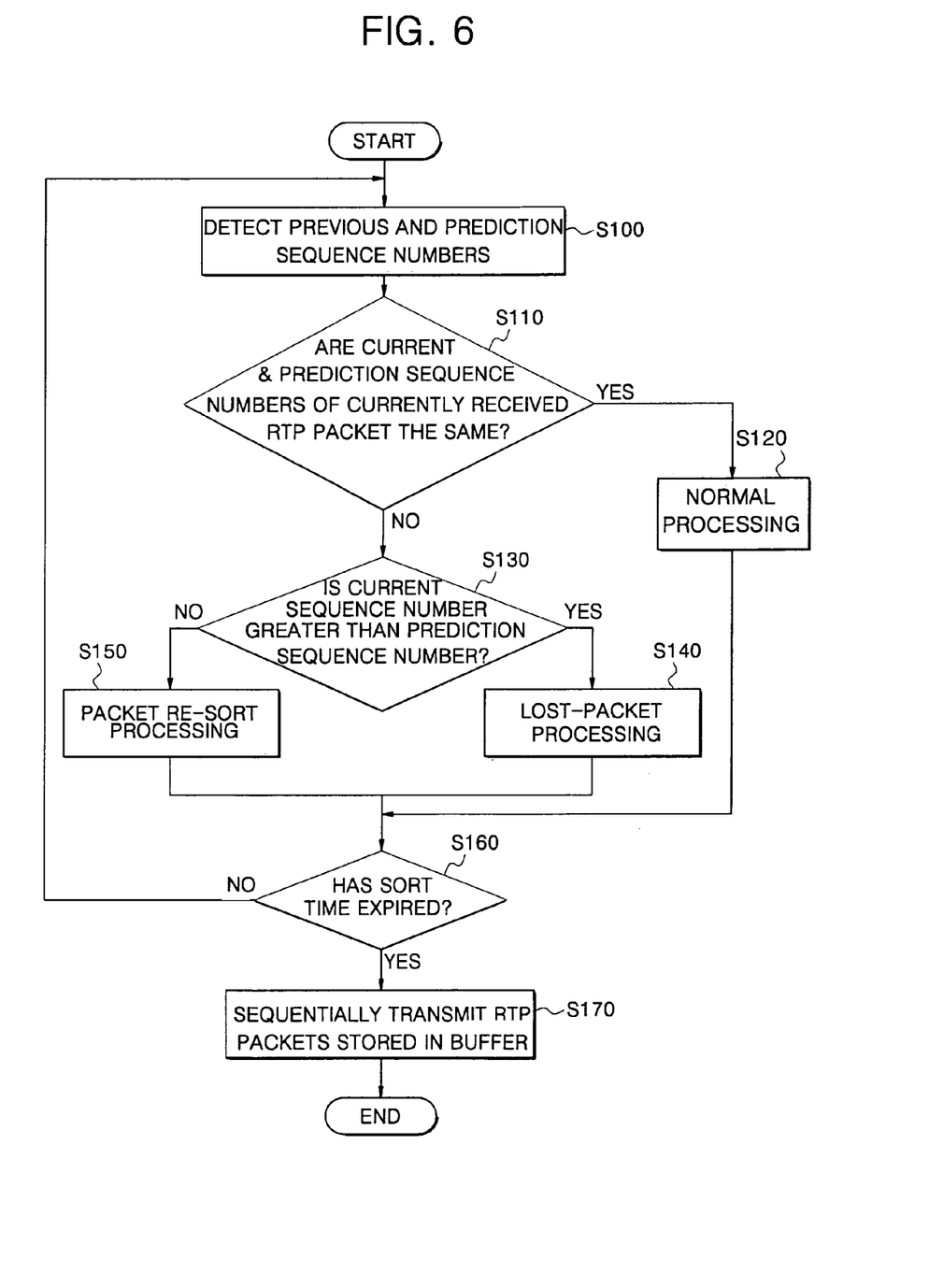
FIG. 6 is a flowchart illustrating a method of processing a packet in a voice and data integration system according to an exemplary embodiment of the present invention.

FIG. 6 is a flowchart illustrating a method of processing a packet in the voice and data integration system in accordance with an exemplary embodiment of the present invention.

Referring to FIG. 6, a case where the voice and data integration apparatus 100 receives a voice packet from the IP network will be described by way of example, but a case where the voice and data integration apparatus 100 transmits a voice packet to another IP network may be also applied in the same manner.

In the voice and data integration apparatus 100, the host driver 120 may process a Real-time Transport Protocol (RTP) packet, which is a voice packet received from the IP network.

The host driver 120 detects a previous sequence number of a previously received Real-time Transport Protocol (RTP) packet, and a prediction sequence number of a reception-predicted Real-time Transport Protocol (RTP) packet (S100).

For example, when the previously received Real-time Transport Protocol (RTP) packet has a sequence number of '3', the host driver 120 detects that the prediction sequence number is '4' that is the expected next sequence number.

The host driver 120 checks whether or not the prediction sequence number is the same as a current sequence number of the currently received Real-time Transport Protocol (RTP) packet (S110).

When the prediction sequence number is the same as the current sequence number, the host driver 120 performs normal processing (S120).

Here, the normal processing is a process in which the host driver 120 temporarily stores the received Real-time Transport Protocol (RTP) packet in the storage region of the buffer 123 corresponding to the sequence number.

Then, the host driver 120 checks whether or not the current sequence number is greater than the prediction sequence number (S130).

When receiving a Real-time Transport Protocol (RTP) packet having a larger sequence number than the prediction sequence number, the host driver 120 processes a lost packet (S140). In other words, when receiving the Real-time Transport Protocol (RTP) packet having the larger sequence number than the reception-predicted Real-time Transport Protocol (RTP) packet, the host driver 120 determines that a Real-time Transport Protocol (RTP) packet having a sequence number between the sequence numbers of the previously received Real-time Transport Protocol (RTP) packet and the currently received Real-time Transport Protocol (RTP) packet is lost, and then performs the lost-packet processing as illustrated by FIG. 7A.

Figure 7A:
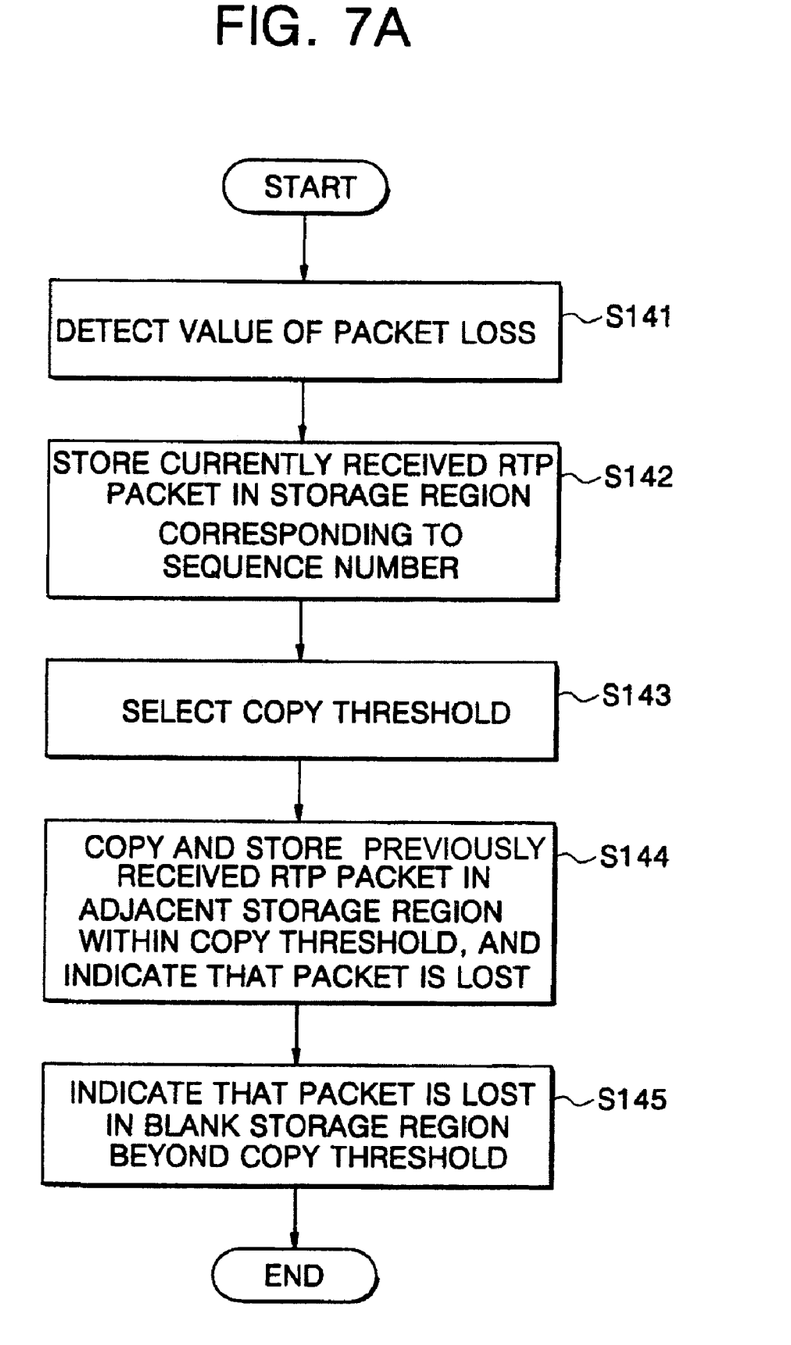
FIG. 7A is a flowchart illustrating the procedure of processing packet loss according to an exemplary embodiment of the present invention.

FIG. 7A is a flowchart illustrating the procedure of processing a lost packet in accordance with an exemplary embodiment of the present invention. The remaining steps of FIG. 6 are described later.

Referring to FIG. 7A, the host driver 120 checks whether or not the Real-time Transport Protocol (RTP) packet is received in a multi-frame form.

In other words, the host driver 120 can detect a multi-frame value through a value obtained by dividing information on the payload length of a Real-time Transport Protocol (RTP) packet based on a type of voice codec by information on the actual payload size of a received Real-time Transport Protocol (RTP) packet.

Since the predicted Real-time Transport Protocol (RTP) packet is not received, the host driver 120 confirms a value of packet loss (S141). In other words, the host driver 120 derives the value obtained by dividing a difference between TimeStamp values of the previously received Real-time Transport Protocol (RTP) packet and the currently received Real-time Transport Protocol (RTP) packet by a transmission period of the voice codec, thereby detecting the value of packet loss.

Such a value of packet loss refers to the number of Real-time Transport Protocol (RTP) packets lost over the network, and is the same as the number of blank storage regions of the buffer 123.

The host driver 120 selects the storage region of the buffer 123, which corresponds to the sequence number of the currently received Real-time Transport Protocol (RTP) packet, as the storage position, and stores the Real-time Transport Protocol (RTP) packet in the selected storage region (S142).

Because there is a blank storage region corresponding to the value of packet loss between the storage regions for storing the currently received Real-time Transport Protocol (RTP) packet and the previously received Real-time Transport Protocol (RTP) packet, the host driver 120 selects the copy threshold (S143) to copy and store the previously received Real-time Transport Protocol (RTP) packet in the blank storage region (S144).

Here, the host driver 120 selects the smaller one of the value of packet loss and a double result value of the payload length of the Real-time Transport Protocol (RTP) packet as the copy threshold.

For example, in case where the previously received Real-time Transport Protocol (RTP) packet has the sequence number of '3' and the currently received Real-time Transport Protocol (RTP) packet has the sequence number of '7', assuming that the value of packet loss is '3' and the payload length value of the Real-time Transport Protocol (RTP) packet is '1', a copy threshold of '2' is obtained.

Accordingly, the host driver 120 selects the copy threshold of '2', copies and stores previously received No. 3 Real-time Transport Protocol (RTP) packet in the fourth and fifth blank storage regions that are next storage regions within the range of the copy threshold and adjacent to the third storage region storing the previous Real-time Transport Protocol (RTP) packet, and stores the PLC flag therein (S144). In other words, the host driver 120 copies and stores the previously received Real-time Transport Protocol (RTP) packet in the next sequential adjacent blank storage region(s), which is within a range of the copy threshold, of the blank storage regions, and indicates that an original Real-time Transport Protocol (RTP) packet is lost.

The host driver 120 then stores in the sixth storage region the BFI flag indicating that the Real-time Transport Protocol (RTP) packet is lost (S145).

Figure 7B:
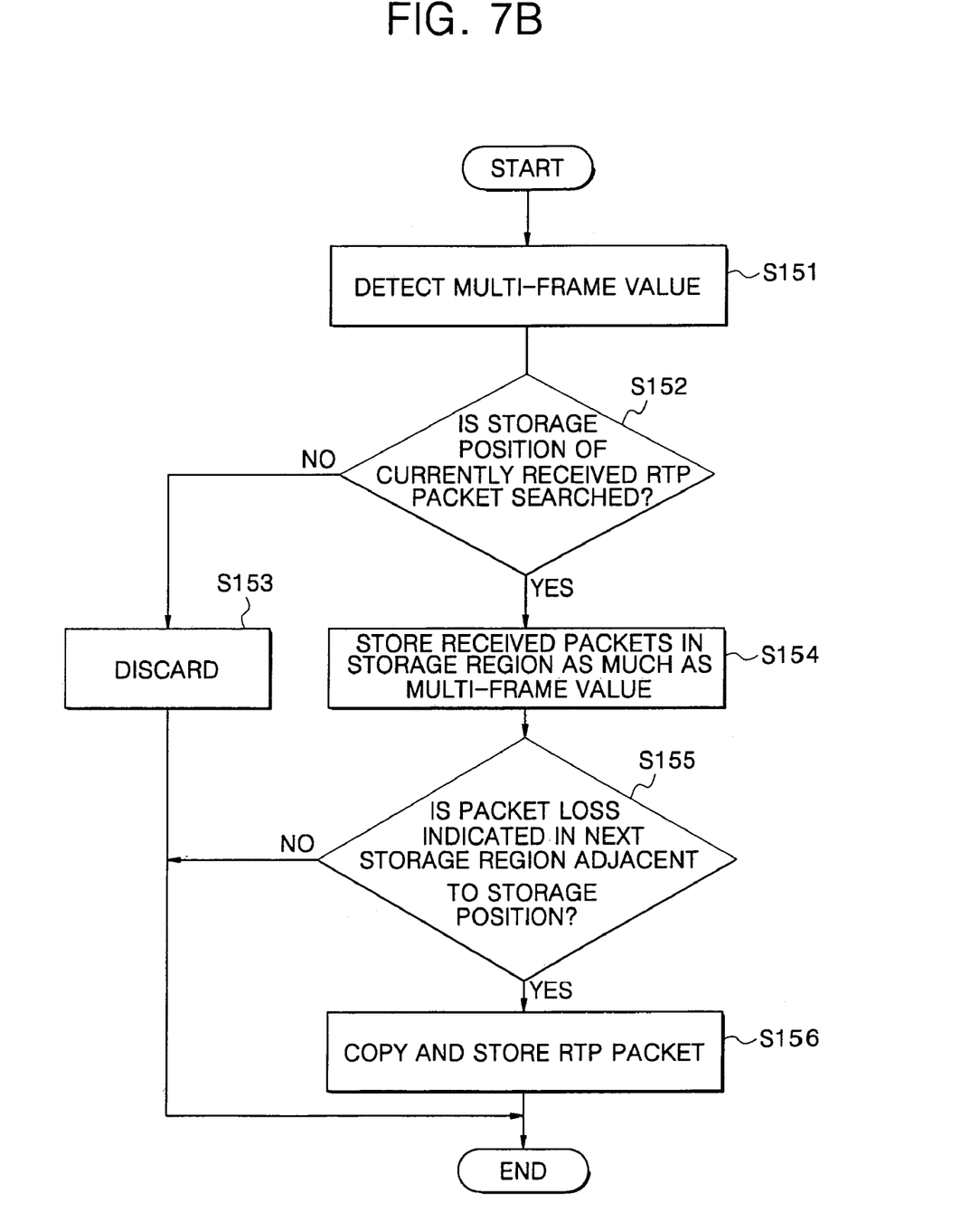
FIG. 7B is a flowchart illustrating the procedure of packet re-sort according to an exemplary embodiment of the present invention.

Meanwhile, referring again to FIG. 6, when receiving a Real-time Transport Protocol (RTP) packet having a smaller sequence number than the prediction sequence number, the host driver 120 re-sorts packets (S150) as illustrated in FIG. 7B.

FIG. 7B is a flowchart illustrating the procedure of re-sorting packets in accordance with an exemplary embodiment of the present invention. The remaining steps of FIG. 6 are described later.

Referring to FIG. 7B, the host driver 120 confirms whether or not the Real-time Transport Protocol (RTP) packet is received in a multi-frame form.

In other words, the host driver 120 can detect a multi-frame value through a value obtained by dividing information on the payload length of a Real-time Transport Protocol (RTP) packet based on a type of voice codec by information on the actual payload size of a received Real-time Transport Protocol (RTP) packet (S151).

The host driver 120 checks whether or not a storage position to store the currently received Real-time Transport Protocol (RTP) packet is searched (S152).

In other words, in order to check whether or not the currently received (e.g., No. 5) Real-time Transport Protocol (RTP) packet has been already processed, the host driver 120 selects the storage position of the storage region(s) preceding the storage region of the buffer 123 in which the previously received (e.g., No. 7) Real-time Transport Protocol (RTP) packet is stored as much as a difference between the sequence number of the previous Real-time Transport Protocol (RTP) packet and the sequence number of the currently received Real-time Transport Protocol (RTP) packet.

The host driver 120 sequentially searches from the storage region (end position) in which the Real-time Transport Protocol (RTP) packet is completely transmitted to the digital signal processor (DSP) 110 to the storage region in which the previous Real-time Transport Protocol (RTP) packet is stored, and checks whether or not there is a storage position corresponding to the sequence number of the current Real-time Transport Protocol (RTP) packet.

When the storage position is not searched from the end position to the storage region in which the previous Real-time Transport Protocol (RTP) packet is stored, the host driver 120 discards the current Real-time Transport Protocol (RTP) packet (S153). Otherwise, the host driver 120 stores the current Real-time Transport Protocol (RTP) packet in the storage region (S154).

Here, the host driver 120 stores frames of Real-time Transport Protocol (RTP) packets received repeatedly as much as the multi-frame value, in the storage region.

The host driver 120 checks whether or not the PLC flag or the BFI flag is stored in the next storage regions adjacent to the storage region in which the current Real-time Transport Protocol (RTP) packet is stored (S155). In other words, the host driver 120 checks whether or not it is expressed that the packet is lost (BFI) in the next storage region adjacent to the storage region in which the current Real-time Transport Protocol (RTP) packet is stored.

Here, the host driver 120 selects the double result value of the payload length value of the Real-time Transport Protocol (RTP) packet, as the copy threshold, and checks whether or not the PLC or BFI flag is stored in the adjacent storage region falling within a range of the copy threshold.

As one example, a case (FIG. 5C) where the current Real-time Transport Protocol (RTP) packet has a sequence number of '5', No. 3 Real-time Transport Protocol (RTP) packet is copied and stored in the fourth and 'fifth' storage regions, and the BFI flag is stored in the sixth storage region will be described.

The host driver 120 selects the storage position of the fifth storage region, and stores No. 5 Real-time Transport Protocol (RTP) packet, which is the current Real-time Transport Protocol (RTP) packet, at the selected storage position and, when the copy threshold is '2', checks whether or not the PLC or BFI flag is stored in the adjacent sixth and seventh storage regions.

Since the BFI flag is stored in the sixth storage region, the host driver 120 copies and stores No. 5 Real-time Transport Protocol (RTP) packet (S156), as illustrated in FIG. 5D. Since No. 7 Real-time Transport Protocol (RTP) packet has been previously stored in the 'seventh' storage region, it terminates the packet re-sort procedure.

Referring again to FIG. 6, the host driver 120 checks whether or not the sort time, which depends on the transmission period (10 ms and 20 ms) or the compression rate defined in the set voice codec (e.g. G.711 and G.729), has expired (S160).

After sorting the received Real-time Transport Protocol (RTP) packets during the sort time, and when the sort time has expired, the host driver 120 sequentially transmits the Real-time Transport Protocol (RTP) packets stored in the buffer 123 to the digital signal processor (DSP) 110 (S170).

FIGS. 8A-8D illustrate a simulation result using a host driver of a voice and data integration apparatus in accordance with an exemplary embodiment of the present invention.

In FIGS. 8A-8D, a mean opinion score (MOS) of result values of simulation applying Perceptual Evaluation of Speech Quality (PESQ) that is the ITU (International Telecommunication Union) standard speech quality measurement algorithm is calculated on the assumption that a G.729a voice codec is used.

Figure 8A:
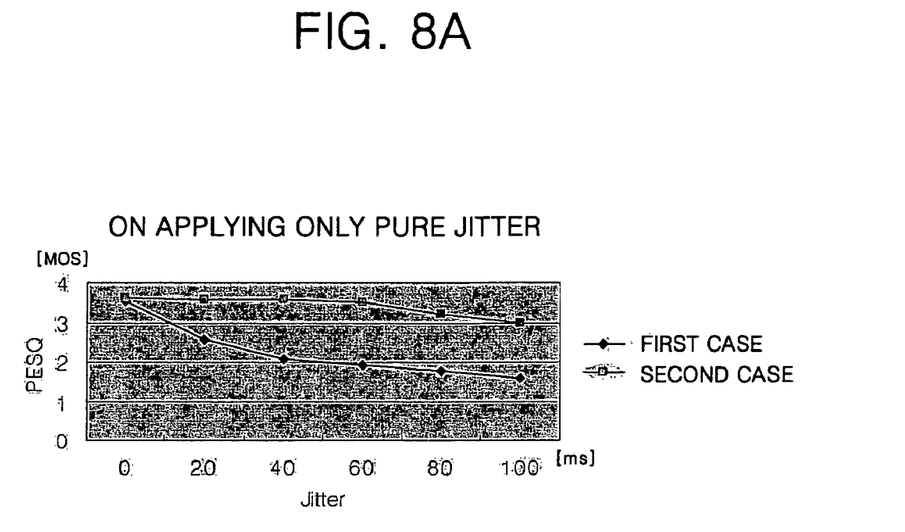
FIGS. 8A-8D illustrate a simulation result using a host driver of a voice and data integration apparatus according to an exemplary embodiment of the present invention.

More specifically, FIG. 8A illustrates simulation results when a host driver 120 having a sort function of Real-time Transport Protocol (RTP) packets is used (a second case) and when only an existing digital signal processor (DSP) 110 is used (a first case), on the assumption that only pure jitter is applied.

Figure 8B:
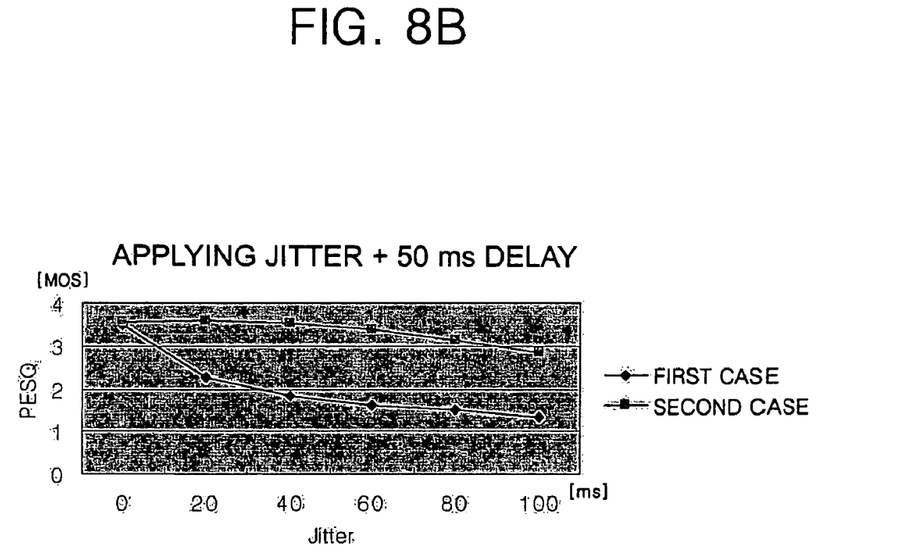
Figure 8C:
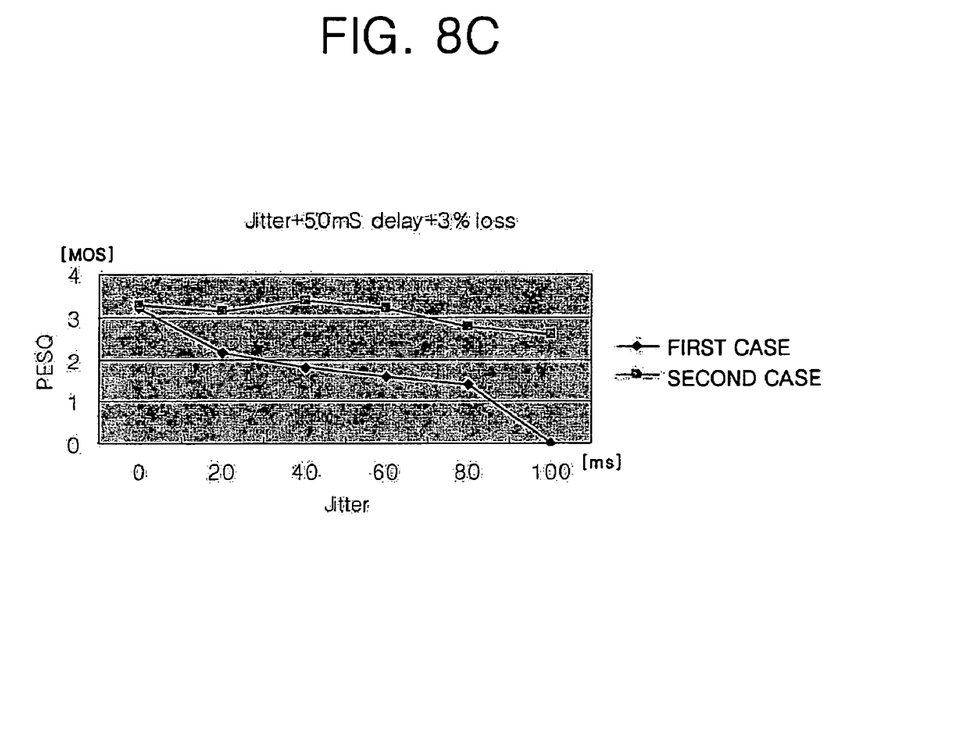
Figure 8D:
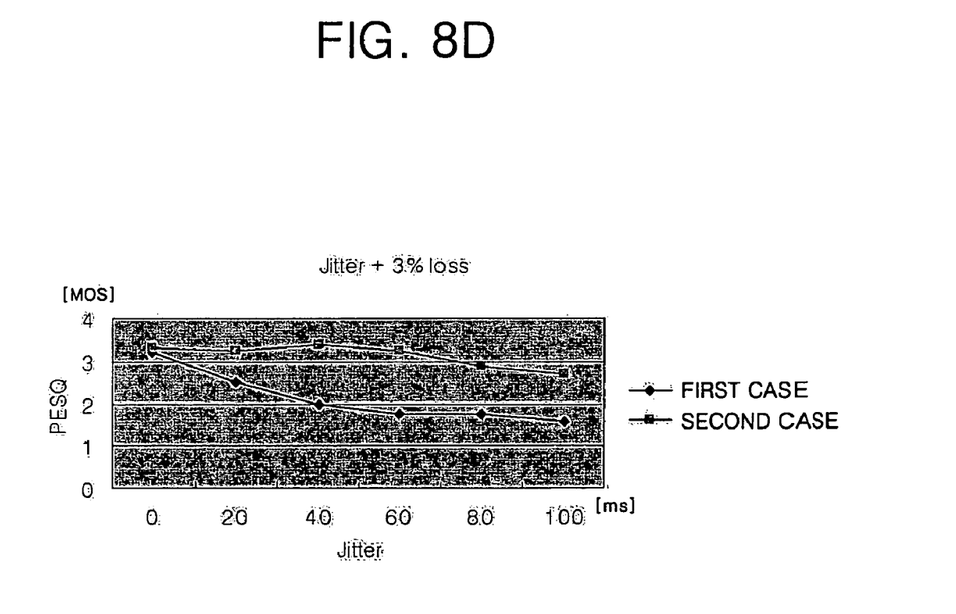

FIG. 8B illustrates simulation results when pure jitter and 50 ms delay are applied to the first and second cases of FIG. 8A. FIG. 8C illustrates simulation results when pure jitter, 50 ms delay, and 3% packet loss are applied to the first and second cases of FIG. 8A. FIG. 8D illustrates simulation results when pure jitter and 3% packet loss are applied to the first and second cases of FIG. 8A.

As illustrated in FIGS. 8A to 8D, it can be appreciated that the voice and data integration system using the host driver 120 with the sort function of the Real-time Transport Protocol (RTP) packet is outstandingly improved in quality of voice, compared to the conventional voice and data integration system.

As described above, the present invention can minimize deterioration of the quality of voice caused by a network load such as the packet loss, the delay, or the jitter, by sorting the received Real-time Transport Protocol (RTP) packets according to the sequence number in the voice and data integration system.

Further, the present invention can enhance algorithm extensibility for guaranteeing the quality of voice, by allowing the host driver of the voice and data integration system to sort and sequentially transmit the Real-time Transport Protocol (RTP) packets to the DSP.

While the present invention has been described with reference to exemplary embodiments thereof, it will be understood by those skilled in the art that various changes in form and detail may be made therein without departing from the spirit and scope of the present invention as defined by the following claims.

What is claimed is:

1. A voice and data integration apparatus, comprising:
a digital signal processor to decode a packet into pulse code modulation (PCM) data; and
a host driver to receive, for a determined time, packets from an Internet protocol (IP) network, to store the received packets in storage regions of the host driver in the order of sequence numbers, and to transmit the stored packets to the digital signal processor in the order of sequence numbers when the determined time has lapsed,
wherein the host driver comprises:
an interface to receive the packets from the IP network;
a buffer comprising a plurality of said storage regions to respectively store the received packets; and
a packet sorting unit to store the received packets in the storage regions of the buffer according to the sequence numbers, and to transmit the packets to the digital signal processor in the sequence of the storage regions of the buffer when the determined time has lapsed, the packet sorting unit designating a region, which completes transmitting the packets to the digital signal processor, of the storage regions of the buffer as a completion position, and designating the next storage region adjacent to the completion position as a start position,
wherein the packet sorting unit detects a first sequence number from a sequence number of a first packet previously received and stored in a first storage region, and when a second sequence number of a currently received second packet is greater than the first sequence number, the packet sorting unit stores the second packet in a second storage region corresponding to the second sequence number, and copies and stores the first packet in a blank storage region among blank storage regions between the first and second storage regions, and
wherein the packet sorting unit copies and stores the first packet and a packet loss concealment (PLC) flag indicating that a packet is lost in a number of blank storage regions among the blank storage regions, within a range of a copy threshold.

2. The apparatus according to claim 1, wherein the packet sorting unit searches, from the start position, for a storage position corresponding to the sequence number of the packet and stores the packet in a storage region of the storage position.

3. The apparatus according to claim 1, wherein, in a blank storage region beyond the copy threshold, the packet sorting unit stores a bad frame indication (BFI) flag indicating that a packet is lost.

4. The apparatus according to claim 1, wherein the copy threshold is a smaller one of a value of packet loss and a value corresponding to a double size value of a transmission period of a received packet.

5. The apparatus according to claim 4, wherein the value of packet loss is a size value corresponding to a value that is obtained by dividing a difference between a TimeStamp value of the first packet and a TimeStamp value of the second packet by a transmission period of a set voice codec.

6. The apparatus according to claim 1, wherein, when the second sequence number is less than the first sequence number and when a storage position of the second packet is not provided between the completion position and the start position, the packet sorting unit discards the second packet.

7. The apparatus according to claim 6, wherein, when the storage position of the second packet is provided between the completion position and the start position, the packet sorting unit stores the second packet at the storage position, and when a PLC flag or bad frame indication (BFI) flag is stored in a storage region within a range of a copy threshold and adjacent to the storage position, the packet sorting unit copies and stores the second packet in the storage region.

8. The apparatus according to claim 1, wherein the packet sorting unit repeatedly stores a received frame in the storage region as much as a multi-frame value of the second packet.

9. The apparatus according to claim 8, wherein the multi-frame value is a value obtained by dividing payload length information of a packet based on a voice codec by payload size information of the second packet.

10. The apparatus according to claim 1, wherein the buffer is a ring buffer employing a circulation storing method.

11. The apparatus according to claim 1, wherein the packet is a real- time transport protocol (RTP) packet.

12. A host driver of a voice and data integration apparatus, comprising:
a buffer having a plurality of storage regions; and
a packet sorting unit to store a first packet received from an Internet protocol (IP) network in a first storage region of said buffer, and when a second sequence number of a second packet is greater than a first sequence number of the first packet by a determined size, to store the second packet in a second storage region of said buffer corresponding to the second sequence number, and to copy and store the first packet in a blank storage region among blank storage regions between the first and second storage regions, and
wherein the packet sorting unit copies and stores the first packet and a packet loss concealment (PLC) flag indicating that a packet is lost in a number of blank storage regions among the blank storage regions, within a range of a copy threshold.

13. A host driver of a voice and data integration apparatus, comprising:
a buffer having a plurality of storage regions; and
a packet sorting unit to store a first packet received from an IP network in a first storage region, and when a second sequence number of a second packet is less than a first sequence number of the first packet, storing the second packet in a second storage region corresponding to the second sequence number, and when a packet is lost, copying and storing the first packet in a storage region within a range of a copy threshold and adjacent to the second storage region, storing a packet loss concealment (PLC) flag indicating that the packet is lost, and storing, in a blank storage region beyond the range of the copy threshold, a bad frame indication (BFI) flag indicating that the packet is lost.

14. The host driver according to claim 13, wherein, when packet transmission is being completed in a storage region between the first and second storage regions, the packet sorting unit discards the second packet.

15. A method of processing a packet in a voice and data integration apparatus, the method comprising:
storing a first packet received from an Internet protocol (IP) network, in a first storage region, and estimating a first sequence number from a sequence number of the first packet;
when a second sequence number of a second packet is the same as the first sequence number, storing the second packet in a second storage region corresponding to the second sequence number;
when the second sequence number is greater than the first sequence number, performing lost-packet processing;

when the second sequence number is less than the first sequence number, performing packet re-sort processing; and when a determined time has expired, sequentially processing packets stored in respective storage regions, and wherein performing the lost-packet processing comprises:

storing the second packet in the second storage region corresponding to the second sequence number;

selecting a smaller one of a double size value of the second packet and a value of packet loss, as a copy threshold;

in a storage region, which is within a range of the copy threshold, provided between the first and second storage regions, copying and storing the first packet, and storing a packet loss concealment (PLC) flag indicating that a packet is lost; and storing, in a blank storage region beyond the range of the copy threshold, a bad frame indication (BFI) flag indicating that the packet is lost.

16. The method according to claim 15, wherein the first sequence number is greater than the sequence number of the first packet by one sequence number.

17. The method according to claim 15, wherein storing of the respective packets in the respective storage regions comprises:

designating a region, which has completed packet processing, of the respective storage regions as a completion position, and designating a next storage region adjacent to the completion position, as a start position; and searching a storage position corresponding to the second sequence number of the second packet from the start position, and storing the second packet in a storage region of the storage position.

18. The method according to claim 15, wherein the value of packet loss is a size value corresponding to a value that is obtained by dividing a difference between a TimeStamp value of the first packet and a TimeStamp value of the second packet by a transmission period of a set voice codec.

19. The method according to claim 15, wherein performing the packet re-sort processing comprises:

storing the second packet in the second storage region corresponding to the second sequence number; and when the PLC or BFI flag is stored in the storage region within the range of the copy threshold and adjacent to the second storage region, copying and storing the second packet in the storage region.

20. The method according to claim 19, further comprising when the second storage region is not provided between the completion position and the start position, discarding the second packet.

21. The method according to claim 19, further comprising:

calculating, as a multi-frame value, a value obtained by dividing payload length information of a packet based on a voice codec by payload size information of the second packet; and repeatedly storing a received frame in the second storage region as much as the multi-frame value.

22. The method according to claim 15, wherein the packet is a real-time transport protocol (RTP) packet.

23. A method of processing a packet in a voice and data integration apparatus, the method comprising:

storing, in a first storage region, a first packet received from an IP network;

when a second sequence number of a second packet is greater than a first sequence number of the first packet by a determined size, storing the second packet in a second storage region separated from the first storage region as much as a difference between the first sequence number and the second sequence number; and copying and storing the first packet in a blank storage region among blank storage regions between the first and second storage regions, wherein the packet sorting unit copies and stores the first packet and a packet loss concealment (PLC) flag indicating that a packet is lost in a number of blank storage regions among the blank storage regions, within a range of a copy threshold.

24. A method of processing a packet in a voice and data integration apparatus, the method comprising:

storing, in a first storage region, a first packet received from an Internet protocol (IP) network;

when a second sequence number of a second packet is less than a first sequence number of the first packet, storing the second packet in a second storage region preceding the first storage region by as much as a difference between the first sequence number and the second sequence number; and when a packet is lost, copying and storing the first packet in a storage region adjacent to the second storage region, storing a packet loss concealment (PLC) flag indicating that the packet is lost, and storing, in a blank storage region beyond the range of a copy threshold, a bad frame indication (BFI) flag indicating that the packet is lost.

* * * * *